US007714279B2

(12) United States Patent
Franzen

(10) Patent No.: US 7,714,279 B2
(45) Date of Patent: May 11, 2010

(54) ORTHOGONAL TIME-OF-FLIGHT MASS SPECTROMETERS WITH LOW MASS DISCRIMINATION

(75) Inventor: Jochen Franzen, Bremen (DE)

(73) Assignee: Bruker Daltonik, GmbH, Bremen (DE)

( * ) Notice: Subject to any disclaimer, the term of this patent is extended or adjusted under 35 U.S.C. 154(b) by 134 days.

(21) Appl. No.: 11/695,796

(22) Filed: Apr. 3, 2007

(65) Prior Publication Data

US 2007/0272848 A1 Nov. 29, 2007

(30) Foreign Application Priority Data

Apr. 11, 2006 (DE) ...................... 10 2006 016 896

(51) Int. Cl.
*B01D 59/44* (2006.01)
*H01J 49/00* (2006.01)

(52) U.S. Cl. ...................................... 250/287; 250/286

(58) Field of Classification Search ................. 250/281, 250/282, 286, 287, 288, 290, 292
See application file for complete search history.

(56) References Cited

U.S. PATENT DOCUMENTS 6,020,586 A 2/2000 Dresch et al.
6,093,929 A * 7/2000 Javahery et al. ............. 250/282
6,285,027 B1 9/2001 Chernushevich et al.
6,545,268 B1 * 4/2003 Verentchikov et al. ...... 250/287
6,670,606 B2 * 12/2003 Verentchikov et al. ...... 250/287
6,753,523 B1 * 6/2004 Whitehouse et al. ........ 250/292
6,770,872 B2 * 8/2004 Bateman et al. ............. 250/281
6,794,640 B2 * 9/2004 Bateman et al. ............. 250/281
6,794,641 B2 * 9/2004 Bateman et al. ............. 250/281
6,815,673 B2 * 11/2004 Plomley et al. ............. 250/292
6,833,544 B1 * 12/2004 Campbell et al. ........... 250/282
6,987,264 B1 * 1/2006 Whitehouse et al. ........ 250/292
7,034,292 B1 * 4/2006 Whitehouse et al. ........ 250/289
7,034,294 B2 * 4/2006 Schwartz et al. ............ 250/292
7,119,331 B2 * 10/2006 Chang et al. ................ 250/292
7,157,698 B2 * 1/2007 Makarov et al. ............ 250/281
7,189,967 B1 * 3/2007 Whitehouse et al. ........ 250/292
7,196,324 B2 * 3/2007 Verentchikov .............. 250/287
7,285,773 B2 * 10/2007 Ding et al. .................. 250/282
7,342,224 B2 * 3/2008 Makarov et al. ............ 250/290
7,381,373 B2 * 6/2008 Blake et al. ................. 422/100
2003/0111595 A1 * 6/2003 Bateman et al. ............. 250/281
2003/0122071 A1 * 7/2003 Plomley et al. ............. 250/292
2003/0132377 A1 * 7/2003 Bateman et al. ............. 250/281

(Continued)

FOREIGN PATENT DOCUMENTS

EP 1 315 196 A2 5/2003

(Continued)

*Primary Examiner*—Bernard E Souw
(74) *Attorney, Agent, or Firm*—Law Offices of Paul E. Kudirka

(57) ABSTRACT

In a time-of-flight mass spectrometer with orthogonal ion injection performed by a pulser to which the ions are fed by an RF ion guide, compensation is provided for mass discrimination that occurs when the ions are injected into the pulser. This is accomplished by designing at least a part of the ion guide as an ion storage device, by emptying the filled ion storage device mass-selectively in ion groups, group-by-group, and by serially feeding the ion groups to the pulser with correct timing, using the mass selectivity of the pulser filling process to compensate for the mass discrimination.

13 Claims, 3 Drawing Sheets

U.S. PATENT DOCUMENTS

| | | | | |
|---|---|---|---|---|
| 2003/0141447 | A1 * | 7/2003 | Verentchikov et al. | 250/287 |
| 2003/0222211 | A1 | 12/2003 | Okumura et al. | |
| 2003/0222214 | A1 | 12/2003 | Baba et al. | |
| 2004/0026613 | A1 * | 2/2004 | Bateman et al. | 250/281 |
| 2004/0079874 | A1 * | 4/2004 | Bateman et al. | 250/281 |
| 2005/0017170 | A1 * | 1/2005 | Schwartz et al. | 250/292 |
| 2005/0061966 | A1 * | 3/2005 | Ding et al. | 250/288 |
| 2006/0284080 | A1 * | 12/2006 | Makarov et al. | 250/290 |
| 2007/0084998 | A1 * | 4/2007 | Franzen et al. | 250/287 |
| 2007/0272848 | A1 * | 11/2007 | Franzen | 250/287 |
| 2008/0111070 | A1 * | 5/2008 | Makarov et al. | 250/290 |
| 2008/0164409 | A1 * | 7/2008 | Schultz et al. | 250/282 |
| 2009/0045334 | A1 * | 2/2009 | Ding | 250/288 |
| 2009/0084949 | A1 * | 4/2009 | Franzen et al. | 250/282 |

FOREIGN PATENT DOCUMENTS

| | | | |
|---|---|---|---|
| GB | 2388248 | A | 11/2003 |
| GB | 2391697 | A | 2/2004 |
| GB | 2 422 051 | A | 7/2006 |
| GB | 2421844 | A | 7/2006 |
| WO | WO 97/47025 | A1 | 12/1997 |
| WO | WO 2004/086441 | A2 | 10/2004 |

* cited by examiner

ORTHOGONAL TIME-OF-FLIGHT MASS SPECTROMETERS WITH LOW MASS DISCRIMINATION

BACKGROUND

The invention relates to time-of-flight mass spectrometers with orthogonal ion injection to which the ions are fed by an RF ion guide. The mass-dependent speed of the ions means that they undergo mass discrimination when injected into the pulser of the time-of-flight mass spectrometer.

Time-of-flight mass spectrometers that pulse a primary ion beam orthogonally to its original flight path into a drift tube are termed OTOF (orthogonal time-of-flight mass spectrometers). FIG. 1 illustrates such an OTOF. They have a so-called pulser (12) at the beginning of the secondary flight path (20) which accelerates a section of the primary ion beam, i.e. a fine string-shaped ion package, into the flight path at right angles to the previous original direction of the beam. This forms a band-shaped secondary ion beam (19) comprising individual string-shaped ion packages for the ions of different masses wherein light ions fly quickly and heavier ions fly more slowly. The direction of flight of this band-shaped secondary ion beam is between the previous original direction of the primary ion beam and the direction of acceleration at right angles to this. Such a time-of-flight mass spectrometer is preferably operated with a velocity-focusing reflector (13) which reflects the whole width of the band-shaped secondary ion beam (19) with the string-shaped ion packages and directs it toward a flat detector (14).

The term "mass" here always refers to the "mass-to-charge ratio" or "charge-related mass" m/z, which alone is of importance in mass spectrometry, and not simply to the "physical mass" m. The number z indicates the number of elementary charges, i.e. the number of excess electrons or protons of the ion, which act externally as the ion charge. All mass spectrometers without exception can measure only the mass-to-charge ratio m/z, not the physical mass m itself. The mass-to-charge ratio is the mass fraction per elementary ion charge. The terms "light" and "heavy" ions here are analogously understood as being ions with low or high charge-to-mass ratio m/z respectively. The term "mass spectrum" always relates to the "mass-to-charge ratios" or "charge-related masses" m/z.

The pulser (12) usually operates at 10 to 20 kilohertz. If one considers a time-of-flight mass spectrometer which operates at 16 kilohertz, 16,000 individual mass spectra are thus scanned per second, said spectra being digitized in a transient recorder and added to form sum spectra. The time for which spectra are added can be set. The time for additions can take a twentieth of a second, in which case around 800 individual mass spectra can be integrated to form a sum spectrum. The addition can also be carried out over ten seconds and encompass 160,000 individual mass spectra in the sum spectrum. This latter sum spectrum then has a very high dynamic measuring range for the ions in the spectrum.

The ions whose mass spectrum is to be measured are not generally a homogeneous ion species but rather a mixture of light, medium and heavy ions. The mass range here can be very broad: in protein digest mixtures, for example, the mass range of interest extends from individual amino acid ions up to peptides with around 40 amino acids, i.e. from a mass of about 50 Daltons to around 5,000 Daltons.

In the time-of-flight mass spectrometer in FIG. 1, the ions of a primary ion beam are extracted from an RF ion guide (10) with the aid of a lens system (11) and injected with a low kinetic energy of only around 20 electron-volts into the emptied pulser (12).

The filling process of the pulser, by injecting the ions, discriminates the ions according to mass. If this filling process of the pulser (12) is stopped after a short time by pulsing out the ions into the flight path (20), the very light ions have already reached the end of the pulser (12), medium-mass ions have only penetrated a short way into the pulser (12), while heavy and hence slow ions have not even reached the pulser (12). The pulse-ejected ion beam (19) thus contains only light and a few medium-mass ions. There are no heavy ions at all. For a very long injection time, on the other hand, during which the heavy ions have penetrated to the end of the pulser (12), these heavy ions are predominant in the pulse-ejected ion beam (19) since the high speed of the medium-mass and light ions means that most of them have already left the pulser (12) at the other end.

For each selected mass range of the mass spectrum there is thus an optimum starting time and an optimum duration for the injection process, the principle of which is already familiar from U.S. Pat. No. 6,285,027 B1 (I. Chernushevich and B. Thompson). A preferred mass range can be set using the starting time and duration of the injection into the pulser, which can be controlled by electric switching of the lens system (11). The energy of the injected ions basically represents a further optimization parameter; this energy of the injected ions, however, is usually not adjustable, or only within very narrow limits, because it is fixed by the geometry of the time-of-flight mass spectrometer, particularly by the distance between pulser (12) and detector (14).

The method of injecting the ions into the pulser at a given energy must be optimized not only with respect to starting time and duration. It is also necessary to generate a fine ion beam of optimum width so that the time-of-flight mass spectrometer has a high resolution. If all ions fly one behind the other precisely in the axis of the pulser (12), and if the ions have no velocity components transverse to the primary ion beam, then theoretically, as can be easily understood, an infinitely high mass resolution can be achieved because all ions of the same mass fly as an almost infinitely thin, string-shaped ion package precisely in the same front and impact onto the detector (14) at precisely the same time. If the primary ion beam (and hence the string-shaped ion package) has a finite cross section, but no ion has a velocity component transverse to the direction of the beam, it is again theoretically possible to achieve an infinitely high mass resolution by space focusing the pulser (12) in the familiar way. The high mass resolution can even be achieved if there is a strict correlation between the location of the ion (measured from the axis of the primary beam in the direction of the acceleration) and the transverse velocity of the ion in the primary beam in the direction of the acceleration. If no such correlation exists, however, i.e. if the locations of the ions and the transverse velocities of the ions are statistically distributed with no correlation between the two distributions, then it is not possible to achieve high mass resolution.

In addition to optimizing the injection process with respect to the mass range of the ions supplied, it is thus also necessary to condition the primary ion beam with respect to its spatial and velocity distribution in order to simultaneously achieve both a high mass range with low mass discrimination and a high mass resolution in the time-of-flight mass spectrometer. To condition the ion beam in this way, ions must be extracted which have been largely collisionally cooled in a neutral collision gas to achieve a very fine beam from the axis of the ion guide (10), and the extraction must be performed by a very good lens system (11).

Ion guides such as the guide (10) generally take the form of multipole RF rod systems filled with collision gas. The ions lose their kinetic energy in collisions with the collision gas and collect in the minimum of the pseudopotential, i.e. in the axis of the rod system. This process is called "collisional focusing". The pseudopotential minimum for light ions is more pronounced and steeper than for heavy ions, so the light ions collect precisely in the axis and the heavier ions more to the outside, kept apart by the Coulomb repulsion of the light ions, as schematically represented in FIG. 2*a*.

If an ion guide is used as an ion storage device which is not continuously refilled, and if the ions are extracted close to the axis in order to generate a fine ion beam, then a further mass discrimination occurs. The light ions, which are close to the axis, are extracted first; the heavier ions are extracted only when the light ions have been exhausted. When the lighter ions have been removed, the heavier ions automatically replace them close to the axis, as shown in FIGS. 2*b* and 2*c*. The effect is particularly large when a quadrupole rod system is used, which has the most pronounced pseudopotential minimum of all multipole rod systems. On the other hand, the finest beam cross section can be produced by a quadrupole rod system, which in turn means that the time-of-flight mass spectrometer demonstrates its best mass resolution.

If, by contrast, an ion storage device is continuously filled with ions, primarily light ions are continuously extracted. The heavy ions suffer a high degree of discrimination. If the rate of filling the ion storage device is very high, it is possible that the heavy ions are not extracted at all but are lost in the ion storage device. To reduce this disadvantage slightly, modern time-of-flight mass spectrometers normally use hexapole rod systems, but these have a slight disadvantage with respect to the mass resolution.

The objective of the invention is to provide an operating method for a time-of-flight mass spectrometer with orthogonal ion injection which has only minimal mass discrimination and where good ion utilization makes it possible to scan spectra with high mass resolution over a broad mass range. A suitable time-of-flight mass spectrometer is also to be provided.

SUMMARY

In accordance with the principles of the invention ions are extracted from an ion storage device mass-selectively in individual portions, feeding the ion portions to the pulser of the time-of-flight mass spectrometer and adjusting the feeding parameters according to the mass range of ions contained in each such ion portion.

Ion "extraction" here does not mean that the ions have to be extracted by forces from the outside. The term "extraction" also encompasses every process in which ions inside the ion storage device are somehow made to leave the storage device.

The invention is explained here using the example of an embodiment which corresponds to the time-of-flight mass spectrometer in FIG. 1. The RF ion guide (10) here is operated as an ion storage device by providing a suitable electrical supply to the lens systems at the entrance and exit ends. It is preferable to use a quadrupole ion storage device which is charged with a collision gas at a pressure between 0.001 and 1 Pascal. The ion storage device is filled at pulsed intervals and emptied in portions over several periods of the pulser each time; the emptying here does not have to be complete. The ion removal is mass-selective: the lens system (11) causes the lightest ions, which have collected in the axis as a result of collision focusing, to be extracted from the ion storage device (10) first. Each extracted portion of ions is injected individually into the pulser. When the lighter ions have been used up, heavier ions increasingly move toward the axis and can then be extracted as illustrated schematically in FIGS. 2*a*, 2*b* and 2*c*. For subsequent pulse periods of the pulser (12) heavier ions are thus increasingly removed and injected into the pulser (12). The process of injecting the ions into the pulser (12) is adjusted to suit the mass of the removed ions each time.

Since each extracted portion of ions encompasses only a limited, relatively small mass range, it is always possible to optimize the injection process to suit the mass range of the ion portions by suitable choice of the extraction time and extraction duration through the lens system (11), the former with respect to the pulsed ejection time of the pulser (12). The ion losses here are low because it is largely possible to avoid the situation where some of the ions either already leave the pulser again or do not reach it at all.

The invention is not limited to the example given here of mass-selective extraction of collisionally focused ions from the ion storage device by a switchable lens. Other methods also exist whereby ions can be guided mass-selectively along the axis and out of an RF ion storage device, for example by resonant pulsed ejection (WO 2004/086441 A2; B. Reinhold) or by ejection in the scatter field (WO 97/47 025 A1; J. W. Hager). These methods are not preferred here because they require more complex controls or they are slow, but they are still to be included in the invention.

Since the ratio of light to heavy ions is not known at the outset, a special feedback control in real time can be used. This involves analyzing the sum spectra as soon as they have been scanned and using the analysis data to control the adjustment of the starting times. The composition of the ions changes regularly only very slowly.

DETAILED DESCRIPTION

While the invention has been shown and described with reference to a number of embodiments thereof, it will be recognized by those skilled in the art that various changes in form and detail may be made herein without departing from the spirit and scope of the invention as defined by the appended claims.

The invention is based on two observations:

1. The extraction of collision-focused ions from an ion-storing multipole system, especially from a quadrupole system, is always mass-selective and discriminates the extracted ions with respect to mass. First the light ions are extracted, then increasingly the heavier ions. According to the prior art, an attempt is made to minimize this discrimination by using hexapole systems as ion storage devices, for example, there being less mass discrimination with such systems.

2. The filling process for the pulser of a time-of-flight mass spectrometer likewise discriminates according to ion mass because ions of different mass have different times of flight from the storage device to the pulser, but an optimum setting of filling parameters can be chosen in each case for the ions of a limited mass range.

The two observations are now combined to give the invention, wherein the mass selectivity of the ion extraction from an ion storage device is not just accepted but rather exploited by giving the ion storage device a suitable shape and mode of operation, and wherein the method of injecting the ions into the pulser of the time-of-flight mass spectrometer is optimized to suit the respective narrow mass range of the injected ions. The invention not only encompasses the mass-selective extraction of ions, which have been stabilized by collisions, by means of a switchable lens system but, as already indicated above, also encompasses other types of mass-selective removal of ions from an ion storage device.

Figure 4:
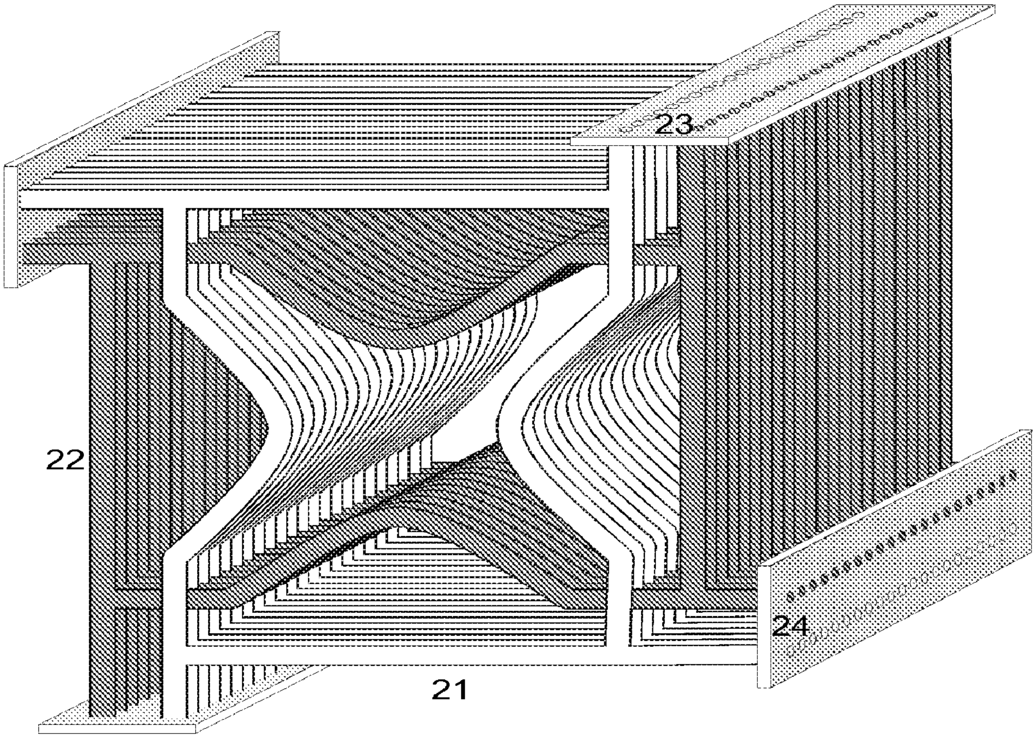
FIG. 4 shows this quadrupole diaphragm stack with a large number of diaphragms (21) and (22) from FIG. 3. The protrusions (27) and (28) of each diaphragm are soldered into an electric circuit board (25) which may also contain everything that is needed to supply the voltages. A diaphragm stack of this type generates a quadrupole field in the interior, onto which an axial DC field can be superimposed to drive ions in one direction. The quadrupole diaphragm stack is eminently suitable for use as the ion storage device (10) in FIG. 1.
Figure 5:
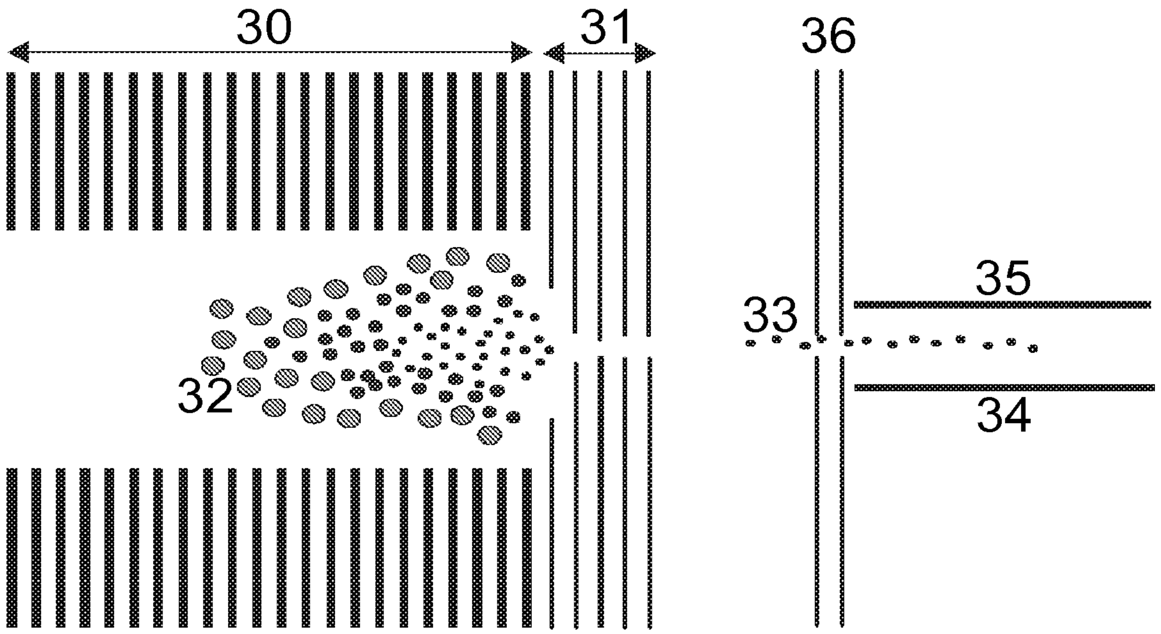
FIG. 5 shows a schematic diagram of a cloud (32) of ions with different masses which, in the interior of a quadrupole diaphragm stack (30), is driven against the switchable lens system (31) by the pseudopotential of the diaphragm stack and a superimposed DC voltage drop. The light ions are at the centre of the cloud, the heavy ones at the outside. The switchable lens system (31) has just extracted a portion (33) of light ions out of the cloud (32) and sent them toward the pulser (34, 35). The pulser consists of an upper plate (35) and a lower plate (34) with a slit, not visible here, through which the ions are pulse ejected after having been accelerated in the transverse direction by applying a high accelerating voltage across the two plates (34) and (35). The diaphragms (36) shield the switchable lens system (31) from the acceleration potential of the pulser (34, 35).

A particularly favorable embodiment for the ion storage device, the switchable lens system and the pulser is given in FIG. 5. In this case, an ion storage device (30) in the form of a quadrupole diaphragm stack is used, as already shown in detail in FIG. 4. Furthermore, the quadrupole diaphragm stack is operated with an axial DC voltage drop, which presses the cloud (32) of stabilized and collisionally focused ions against the switchable lens system (31). Inside the cloud (32) the light ions are collected in the center while the heavy ions are pressed outward.

The switchable lens system can now extract small portions (33) of ions to fill the pulser (34, 35) and accelerate them toward the pulser (34, 35). The DC voltage drop across the quadrupole diaphragm stack (30), which pushes the ions against the switchable lens system (31), can extract a relatively large number of ions within a brief period of around only a few tens of microseconds. The accelerating voltage for these extracted ions is around 30 volts; the energies of the extracted ions are very homogeneous and the ions are focused to a very fine, high-quality beam by the switchable lens system (31). The length of time for which the portion of ions is extracted can be selected using the switchable lens system (31) so as to create an ion beam package whose length exactly fills the pulser (34, 35). When this portion has just arrived in the pulser, the pulser (34, 35) is switched by applying a high voltage of five to ten kilovolts across the two plates (34) and (35). The ions are pulse ejected through a slit in one of the two plates and sent on their way through the drift region of the time-of-flight mass spectrometer.

Once the ion storage device (10) is either partially or completely empty, it can be refilled from preceding parts of the ion guide, for example from part (6), which is used as the intermediate ion storage device, and the emptying processes can begin again. It takes between one and two milliseconds to fill the ion storage device (10) if the ion storage device has a suitable design; this time includes stabilizing the ions. The ions are then removed in portions from the ion storage device (10) over many pulse periods of the pulser (12), the filling time being adjusted to the mass of the extracted ions each time. The extraction can be done over 10 to 20 or more pulse periods depending on the number of ions in the ion storage device (10) and the mass range of interest for the sum spectrum.

Figure 1:
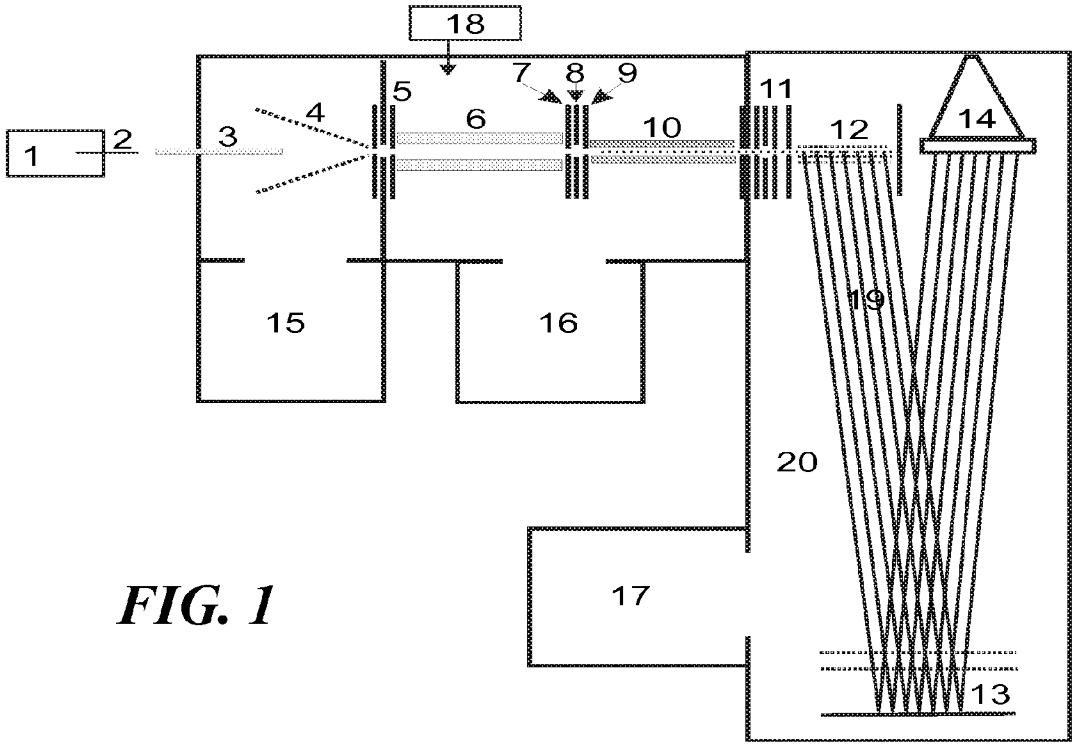
FIG. 1 shows a schematic representation of the principle of a time-of-flight mass spectrometer in accordance with the prior art which can also be used to realize the present invention. An operating mode with temporary storage of the ions looks like this: Ions are generated at atmospheric pressure in an ion source (1) with a spray capillary (2), said ions being introduced into the vacuum system through an input capillary (3). An ion funnel (4) guides the ions through a lens system (5) into a first ion storage device (6) from which ions switched by a further lens system (7, 8, 9) can be transferred into a second ion storage device (10). The ion storage devices (6) and (10) are charged with collision gas by a gas feed device (not shown) in order to focus the ions by means of collisions. The switchable lens (11) charges the pulser (12) with ions from the ion storage device (10) each time. The pulser pulse ejects a section of the ion beam orthogonally into the drift region (20). The ion beam (19) is reflected in the reflector (13) with velocity focusing and is measured in the detector (14). The mass spectrometer is evacuated by the pumps (15), (16) and (17).
Figures 2A, 2B, 2C:
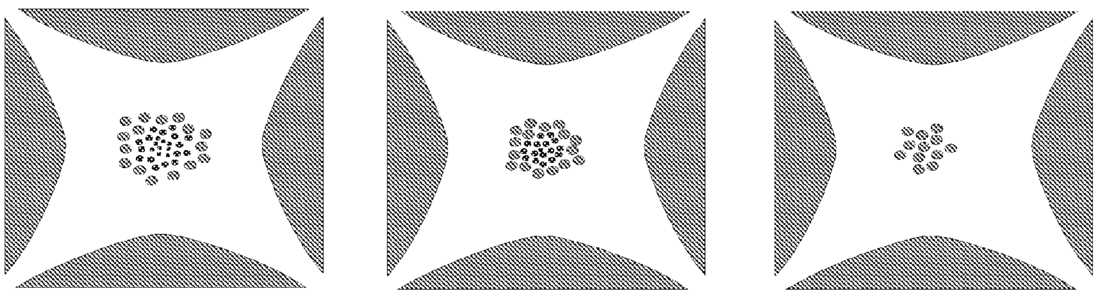
FIG. 2 is a schematic representation of the distribution of stabilized, thermalized ions in a cross section through a quadrupole system: the light ions (small circles) collect in the central axis and keep the heavier ions (large circles) further to the outside (FIG. 2*a*). After the light ions close to the axis have been extracted, the heavier ions automatically move toward the axis (FIGS. 2*b* and 2*c*).
Figure 3:
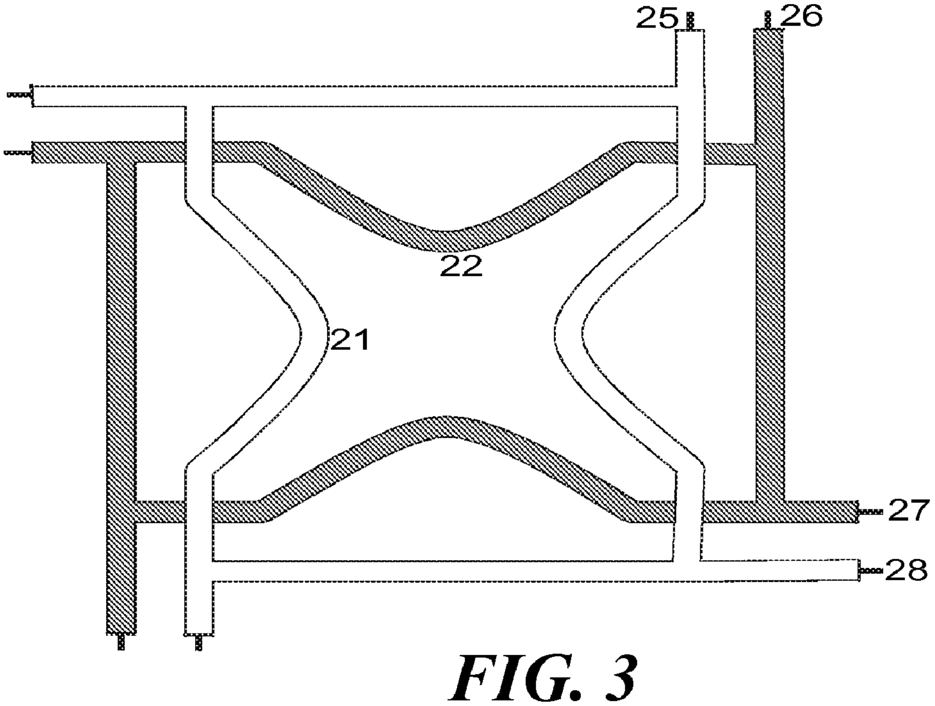
FIG. 3 shows two sheet electrodes (21) and (22) which can be assembled to form a quadrupole diaphragm stack as shown in FIG. 4.

When the ion storage device has been emptied, it can be refilled again from a preceding ion guide, for example the ion guide (6) in FIG. 1. This ion guide must also be operated as an ion storage device. It is particularly favorable if this intermediate ion storage device is also in the form of a quadrupole diaphragm stack because it is then possible to achieve a particularly fast transfer of the ions by applying a DC voltage drop across the diaphragm stack.

To operate the time-of-flight mass spectrometer it is generally better to use a constant pulsed ejection frequency at the pulser, i.e. with a constant acquisition rate for the mass spectra. In this case, the time at which the switchable lens system between ion storage device and pulser begins the extraction must always be adjustable with respect to the time of the pulsed ejection. The extraction period for the individual ion portions is also adjustable. If the ion portions are to be of equal length in order to fit precisely into the pulser, then the different ion speeds mean that the extraction duration must be selected so as to be proportional to the root of the mass. This can result in the ion extraction of a subsequent process of injecting ions into the pulser beginning before the pulsed ejection of the current filling. Shielding diaphragms (36) are mounted in front of the pulser so that the high voltage pulse at the pulser does not disturb the work of the switchable lens system.

If the diameter of the ion beam which is injected into the pulser can be reduced from the now usual 0.6 millimeters to around 0.3 millimeters, then theoretically the resolution of the time-of-flight mass spectrometer is improved by a factor of four because the residual errors of the spatial focusing are quadratic. Modern bench-top instruments with drift regions of around one and a half meters have resolutions of around R=15,000, i.e. two ions with the masses 5,000 and 5,001 can be readily separated from each other. It will not, however, be possible to fully achieve the improvement by a factor of four to R=60,000 because other influences will also play a role, for example detector influences. But it is to be expected that the mass accuracy, which amounts to around three millionths of the mass for the current time-of-flight mass spectrometers with the above-described design, will increase considerably. With this invention it is to be expected that the mass accuracies will be in the region of one millionth of the mass to be measured.

Such a mass spectrometer will not only have a higher mass accuracy; the duty cycle for the ions will also increase because the pulser can always be precisely filled with ions and only a few ions are lost. The relatively dense filling of the pulser with ions which is possible with the system shown in FIG. 5 can only be exploited efficiently in mass spectrometers with analog-to-digital converters (ADC) since it is necessary to use a detector which can also produce good quantitative measurements of larger numbers of ions in one measurement period.

With modern ion sources and systems for introducing the ions into the vacuum system, the ion current in the vacuum system can quite easily reach around one picoampere in the maxima of the substance feed to the ion source. This corresponds to around a thousand ions in the pulser at a pulse frequency of ten kilohertz. If the pulser is filled with around a thousand ions, then the number of ions which can be collected in one measurement period of the ADC can quite easily be around 200 ions because a mass peak extends over five to ten measurement periods. Modern transient recorders incorporate analog-to-digital converters with sufficient speed and sufficient measuring width to fulfill this task. With an eight-bit digitizing width they can measure at a rate of two gigahertz, possibly even faster in the future.

However, in order to transfer around a thousand ions out of the ion storage device into the pulser in a brief period lasting only about 60 microseconds, which is the time available at a 16 kilohertz acceptance rate, the switchable lens system at the output of the ion storage device must have a favorable embodiment and the setting of the potentials must be good, said potentials determining both the intensity of the extraction field as well as the accelerating voltage for the ions. Furthermore, in the interior of the ion storage device the ions must be in the narrow access region of the switchable lens system. For this reason the ion storage device in the form of the diaphragm stack is proposed here, which allows the ions to be collected in front of the switchable lens by means of the superimposed DC voltage drop. As this quadrupole diaphragm stack empties, the DC voltage drop can be continuously increased to accelerate the complete emptying since the heavy ions, in particular, require a lot of thrust to leave this storage device quickly.

As the ion storage device empties, the heavier and more sluggish ions are always left behind. In order to accelerate removal of the ions as the emptying progresses, not only can the DC voltage drop be progressively increased; the RF voltage across the diaphragms of the ion storage device, which is in the form of a diaphragm stack, can be increased at the same time in order to bring the heavy ions closer to the axis of the ion storage device. The RF voltage cannot be set high from the beginning because otherwise the light ions will be expelled by the lower mass limit of the ion storage device.

Adjustment of the method of injecting the ions into the pulser to suit the respective mass range of the ions removed mass-selectively, with simultaneous adjustment of the quantity of removed ions, can be optimized by setting a wide range of injection parameters, for example:

a. Starting time for the injection process into the pulser with respect to the pulsed ejection of the ions from the pulser, controlled via the potentials of the switchable lens system,
b. Duration of the injection process, controlled by the potentials of the switchable lens system,
c. Extraction voltages for the ions in the switchable lens system,
d. Accelerating voltage for the ions in the switchable lens system,
e. RF voltage across the ion storage device, and
f. DC voltage drop along the axis in the ion storage device.

These parameters can all be changed incrementally or continuously as the ion storage device empties in order to achieve an optimally adjusted filling of the pulser each time as the ion storage device is emptied portion by portion.

Time-of-flight mass spectrometers which do not correspond to FIG. 1 can also have further setting parameters for optimum injection into the pulser. It is therefore conceivable that a time-of-flight mass spectrometer can have an injection path for the ions from the ion storage device to the pulser whose length is adjustable and where the flight path is an additional setting parameter. The flight path here does not have to be mechanically adjustable; an electric adjustment can also be introduced, for example, by temporarily storing the ion portions which have been mass-selectively removed from an ion storage device in another ion storage device where the storage location can be adjusted electrically.

The composition of the mixture of light, medium and heavy ions is generally not known before the indiscriminate scanning of mass spectra. Therefore it is also not known at the outset how the emptying of the ion storage device will proceed and how the processes of injecting the ions into the pulser can be optimally controlled. However, since the composition of the ions generally changes relatively slowly over a period of seconds (even when the substances are fed by rapid chromatographic systems), a feedback method is beneficial here. This is assisted by the fact that sum spectra can be measured at intervals of a twentieth of a second in time-of-flight mass spectrometers of this type.

A feedback method can analyze each of the sum spectra scanned and thereby determine the filling level of the ion storage device and the mass distribution of the ions. By this method an algorithm for controlling the parameters of the injection method can be determined. Iterative steps can be used to approximate the control algorithm for the injection method to an optimum behavior.

The filling level and mass distribution can also be determined in a single step, however. This involves scanning a sum spectrum which operates with no control whatsoever for the method of injecting the ions into the pulser and also without the ions being injected portion by portion, but rather with an ion beam which is continuously in transit. The content of the ion storage device is continuously transferred into the pulser and only interrupted by the pulsed ejection. This method uses a setting which is optimal for the highest ion mass of interest. The sum spectrum thus obtained is, of course, mass-discriminated, but the type of mass discrimination is known. As the heaviest ions fill the pulser exactly up to the end, the majority of the fast, light ions have left the pulser again. As the speeds of the ions are proportional to the roots of their masses, the measurement of ions which are a hundred times lighter than the highest ion mass is therefore precisely a factor of ten too low. This can be used to calculate the true distribution of the ions over the various masses; and this calculation can be used to determine an optimum method for the process of injecting ions into the pulser.

As detailed here, the advantages of the invention lie not only in minimizing the mass discrimination, but also in very good conditioning of the ion beam to the pulser for a good resolution of the time-of-flight mass spectrometer, in high utilization of the ions without any major ion losses, and in rapid filling of the pulser with an optimally large quantity of ions in each case so that higher ion currents than before can be handled by the inlet system into the vacuum system. This makes it possible to achieve a higher sensitivity.

What is claimed is:

1. A method for operating a time-of-flight mass spectrometer in which ions from an RF ion guide are injected, via a lens system, into a pulser that operates periodically, comprising:

operating at least a part of the ion guide as an ion storage device in which ions of all masses are stored together in a single trapping region and from which, after the ion storage device has been filled and before additional ions are introduced into the storage device, groups of ions are mass-selectively extracted over several periods of the pulser, wherein the ions in each extracted group have masses within a mass range and wherein the mass range is varied so that ion groups including the lightest ions are first extracted, and in subsequent pulser periods, ion groups including increasingly heavier ions are extracted; and during each pulser period, accelerating an extracted group of ions without fragmenting the ions and injecting the accelerated group of ions into the pulser, using acceleration and injection parameters that are changed according to the mass range of the ions within that extracted group of ions in order to optimize ion injection into the pulser.

2. The method according to claim 1, wherein the ion storage device is filled with a collision gas.

3. The method according to claim 1, wherein a quadrupole ion storage device is used as the ion storage device.

4. The method according to claim 3, wherein an axial DC voltage drop is generated in the quadrupole ion storage device.

5. The method according to claim 1, wherein the group-by-group extraction of the ions from the ion storage device and the acceleration of the ion groups for injection into the pulser are carried out by switching potentials across a lens system.

6. The method according to claim 5, wherein the acceleration and injection parameters include at least one of the start time for the ion extraction with respect to the pulse ejection time from the pulser, the duration of the extraction, acceleration and injection process, the value of the extraction voltages in the switchable lens system, the value of the accelerating voltage for the ions in the switchable lens system, the value of the RF voltage across the ion storage device, and the value of the axial DC voltage drop in the ion storage device.

7. The method according to claim 5, wherein a predetermined timing scheme is selected for the pulsed ejection of the ions out of the pulser, and wherein the acceleration and injection parameters include the start time of the extraction process.

8. The method according to claim 1, wherein the mass range of an extracted group of ions is determined from an analysis of an ion mixture in previously-acquired mass spectra.

9. The method according to claim 1, wherein the mass range of an extracted group of ions is determined from an analysis of an ion mixture in a specially-acquired mass spectrum.

10. A time-of-flight mass spectrometer comprising:

a pulser that operates periodically;

an RF ion guide, at least part of which is operated as an ion storage device containing ions of all masses stored together in a single trapping region and having an axial DC voltage drop;

a lens system that, after the ion storage device has been filled and before additional ions are introduced into the storage device, mass-selectively extracts groups of ions from the ion storage device over several periods of the pulser, wherein the ions in each extracted group have masses within a mass range and wherein the mass range is varied so that ion groups including the lightest ions are first extracted, and in subsequent pulser periods, ion groups including increasingly heavier ions are extracted; and means operable during each pulser period for accelerating an extracted group of ions without fragmenting the ions and injecting the accelerated group of ions into the pulser, using acceleration and injection parameters that are changed according to the mass range of the ions within that extracted group of ions in order to optimize ion injection into the pulser.

11. The time-of-flight mass spectrometer according to claim 10, wherein the ion storage device comprises a quadrupole diaphragm stack.

12. The time-of-flight mass spectrometer according to claim 11, comprising a voltage supply generating an adjustable axial DC voltage drop in the quadrupole diaphragm stack.

13. A method for operating a time-of-flight mass spectrometer having an ion storage device in which ions of all masses are stored together in a single trapping region and a pulser that periodically pulses ions into the mass spectrometer, comprising:

(a) filling the ion storage device with ions;

(b) after the ion storage device is filled and before additional ions are introduced into the ion storage device, operating the ion storage device to mass selectively extract a group of ions from the ion storage device, wherein each ion in the group has a mass falling within a predetermined mass range;

(c) accelerating the extracted ions without fragmenting the ions;

(d) injecting the accelerated ions into the pulser using an injection method with parameters that are changed according to the predetermined mass range so that the accelerated ions are optimally injected into the pulser;

(e) operating the pulser to pulse the ions therein into the mass spectrometer; and (f) repeating steps (b) to (e) while operating the ion storage device to vary the predetermined mass range.

* * * * *